(12) United States Patent
Pawusch

(10) Patent No.: US 8,443,751 B2
(45) Date of Patent: May 21, 2013

(54) MOTOR VEHICLE DISPLAY

(75) Inventor: Wolfgang-Peter Pawusch, Hochheim (DE)

(73) Assignee: Continental Automotive GmbH, Hannover (DE)

( * ) Notice: Subject to any disclaimer, the term of this patent is extended or adjusted under 35 U.S.C. 154(b) by 377 days.

(21) Appl. No.: 12/673,194

(22) PCT Filed: Jul. 21, 2008

(86) PCT No.: PCT/EP2008/059529
§ 371 (c)(1),
(2), (4) Date: Feb. 12, 2010

(87) PCT Pub. No.: WO2009/021806
PCT Pub. Date: Feb. 19, 2009

(65) Prior Publication Data
US 2011/0126756 A1    Jun. 2, 2011

(30) Foreign Application Priority Data
Aug. 14, 2007 (DE) .......................... 10 2007 038 475

(51) Int. Cl.
*G01D 7/00* (2006.01)
(52) U.S. Cl.
USPC .......................... 116/300; 116/28 R; 116/62.4
(58) Field of Classification Search
USPC .................. 116/286–288, 305, 334, DIG. 36, 116/300–301, 62.4, 28 R, 290; 362/26–30, 362/85
See application file for complete search history.

(56) References Cited

U.S. PATENT DOCUMENTS

| | | | | | |
|---|---|---|---|---|---|
| 1,435,422 | A | * | 11/1922 | Schiske | 235/61 B |
| 1,467,847 | A | * | 9/1923 | Fulton | 235/61 J |
| 1,558,452 | A | * | 10/1925 | Barbe | 73/291 |
| 2,293,473 | A | * | 8/1942 | Schlucter | 73/861.71 |
| 2,649,709 | A | * | 8/1953 | Sturtz | 73/114.53 |
| 3,314,602 | A | * | 4/1967 | Finkelstein | 235/61 R |
| 4,217,644 | A | * | 8/1980 | Kato et al. | 701/123 |
| 4,346,665 | A | * | 8/1982 | McRoberts | 116/28 R |
| 4,570,226 | A | * | 2/1986 | Aussedat | 701/123 |
| 4,663,718 | A | * | 5/1987 | Augello et al. | 701/527 |
| 5,129,269 | A | | 7/1992 | Iizuka et al. | |
| 5,459,666 | A | * | 10/1995 | Casper et al. | 701/123 |
| D378,500 | S | * | 3/1997 | Nakai et al. | D10/125 |
| 5,916,298 | A | * | 6/1999 | Kroiss et al. | 701/123 |
| 6,453,731 | B1 | | 9/2002 | Yaegashi | |
| 6,906,634 | B1 | * | 6/2005 | Kuenzner et al. | 340/815.78 |
| 7,237,203 | B1 | * | 6/2007 | Kuenzner | 715/764 |
| 8,101,265 | B2 | * | 1/2012 | Dobler et al. | 428/195.1 |
| 2010/0191419 | A1 | * | 7/2010 | Habeney | 701/36 |

FOREIGN PATENT DOCUMENTS

| | | |
|---|---|---|
| DE | 2910682 | 9/1979 |
| DE | 3936373 | 5/1991 |
| DE | 30 46 079 C2 | 8/1993 |
| DE | 19755470 | 9/1998 |

(Continued)

*Primary Examiner* — Peter Macchiarolo
*Assistant Examiner* — Tania Courson
(74) *Attorney, Agent, or Firm* — Cozen O'Connor

(57) ABSTRACT

A motor vehicle display with a first indicator and a first dial in which an average fuel consumption is indicated on the first dial by the first indicator. There is a second dial and the first indicator, in conjunction with the second dial, indicates a distance which can still be covered with the amount in the vehicle tank, wherein the second dial is followed automatically.

20 Claims, 2 Drawing Sheets

FOREIGN PATENT DOCUMENTS

| | | |
|---|---|---|
| DE | 19959597 | 2/2001 |
| DE | 10109905 | 8/2002 |
| DE | 202 13 491 U1 | 2/2003 |
| DE | 102 49 765 A1 | 5/2004 |
| EP | 997338 | 5/2000 |

* cited by examiner

MOTOR VEHICLE DISPLAY

PRIORITY CLAIM

This is a U.S. national stage of application No. PCT/EP2008/059529, filed on Jul. 21, 2008 which claims priority to the German Application No.: 10 2007 038 475.2, filed: Aug. 14, 2007, the content of both incorporated herein by reference.

BACKGROUND OF THE INVENTION

1. Field of the Invention

The invention relates to a motor vehicle display having a first pointer and a first scale by which an average fuel consumption is displayed on the first scale by the first pointer.

2. Prior Art

It is known from the prior art that the average consumption is displayed by a pointer or in digital form, in particular the instantaneous consumption being represented by a pointer that is guided along a scale, while the average consumption is mostly displayed digitally. The digitally represented average consumption permits only a complex assignment of the current way of driving to the still available fuel and the distance that can still be covered therewith.

SUMMARY OF THE INVENTION

It is therefore an object according to one embodiment of the invention to explain the fundamental relationships between fuel consumption and range of the vehicle. This object is achieved by virtue of the fact that in the abovementioned motor vehicle display a second scale is present and that in cooperation with the second scale the first pointer displays a distance that can still be covered given the fuel tank level of the vehicle, the second scale being followed. The result is that it is possible, at a glance, to perceive both the average consumption and the distance that can still be covered with the existing fuel quantity.

When a second pointer displays an instantaneous fuel consumption in cooperation with the first scale, this display of the instantaneous consumption permits direct comparison with the average consumption, and thus the influence of the present way of driving on the range. Furthermore, the viewer can also immediately assign all the other consumption values of the scale to the corresponding value of the range. Designing one or both scales as a dot matrix display yields a mechanical design that is particularly easy to implement.

When one or both scales have fixed marks and the scales are arranged in a variable position, the optical effect of the display is particularly unappealing. When the scales can be rotated relative to one another, they can, for example, have a common fulcrum and so can be easily integrated in another display device of the motor vehicle, for example at the edge of a revolutions counter. When these two scales can be rotated at different fulcrums, they can, for example, be integrated in two neighboring display instruments such as, for example, revolutions counter and a tachometer.

If one or both scales can be displaced along a straight line, a simple mechanical design is achieved. Furthermore, the display can likewise easily be integrated in an existing combination instrument. When the fixed marks are configured as scale bars or scale values, a scale that can be easily read is achieved.

When the fixed marks are printed, they can easily be perceived. When the fixed marks are implemented by a change in height of the surface, the result is a particularly superior impression of the scale, and thus of the entire instrument; for example, the fixed marks can be engraved in the surface of the scale or configured as elevations with respect to the surface of the scale.

When the position of the first scale can be set and the first pointer is movably arranged, the driver can, for example, define a long term average value or personal target consumption value as the consumption scale. Deviation from this value is thus particularly easily perceived, since when there is a deviation, the first pointer is moved from the middle of the first scale.

Of course, it is then preferable for the second scale to be followed, so that the distance that can still be covered, given the fuel tank level, is correctly represented.

BRIEF DESCRIPTION OF DRAWINGS

The invention is explained in more detail below with the aid of the figures, in which.

DETAILED DESCRIPTION OF THE PREFERRED EMBODIMENTS

Figure 1:
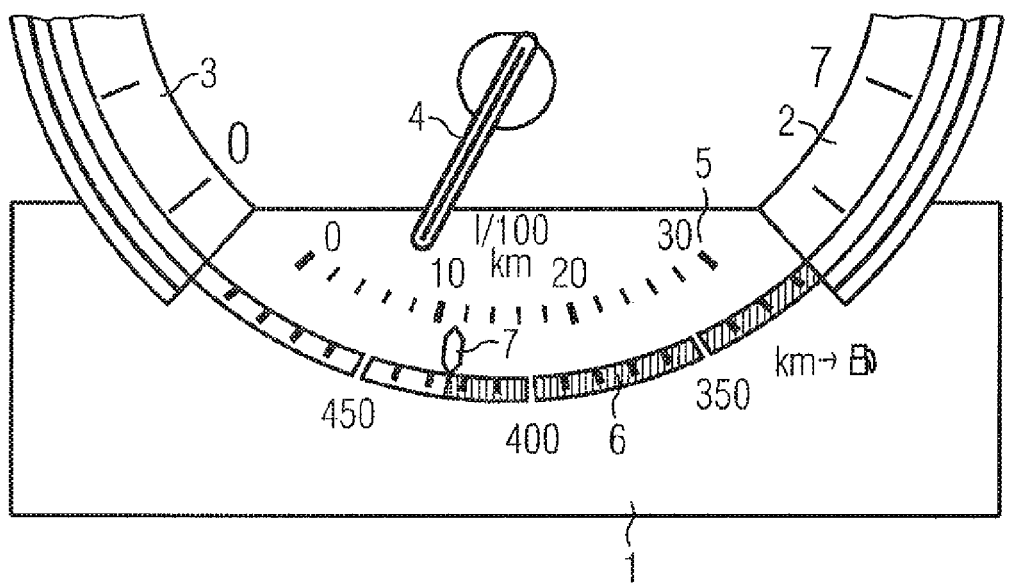
FIG. 1 is a first exemplary embodiment.

A dot matrix display 1, scale segments 2, 3 and a second pointer 4 are to be seen in FIG. 1. The dot matrix display 1 has a first scale 5 and a second scale 6 and a first pointer 7. The first scale 5 has scale bars and numbers that indicate the consumption in liters per 100 kilometers. The second scale has scale bars and numbers that represent in kilometers the distance that can still be covered given a fuel tank level of the vehicle. The first pointer 7 shows both a value on the first scale 5 and one on the second scale 6. The first pointer 7 displays by its position on the first scale 5 the average consumption in liters per 100 kilometers and the dot matrix display can be driven such that the first scale 5 is displayed without change in the course of time. The first pointer 7 has its position changed in accordance with the average fuel consumption. In accordance with the position of the first pointer 7 and the existing fuel tank level, the second scale 6 indicates the distance that can still be covered by the vehicle given the fuel tank level, the average consumption being the basis for the determination of the distance that can be covered.

The second pointer 4 is a pointer that is actually present and can be rotated by an electric motor about an axis of rotation and can thus be moved along the first scale 5. In cooperation with the first scale 5 it displays the instantaneous fuel consumption per 100 kilometers.

The scale segments 2, 3 are, for example, produced from printed plastic and are part of a revolutions counter that is not otherwise illustrated.

It is also possible for the first scale 5 to be represented in such a way that the average consumption or a desired average consumption is represented at the middle of the scale, and the scale is not changed during operation. The first pointer 7 is then moved more to the right or left in accordance with average consumption such that it is very easy to perceive a deviation from the desired or other average consumption.

Figure 2:
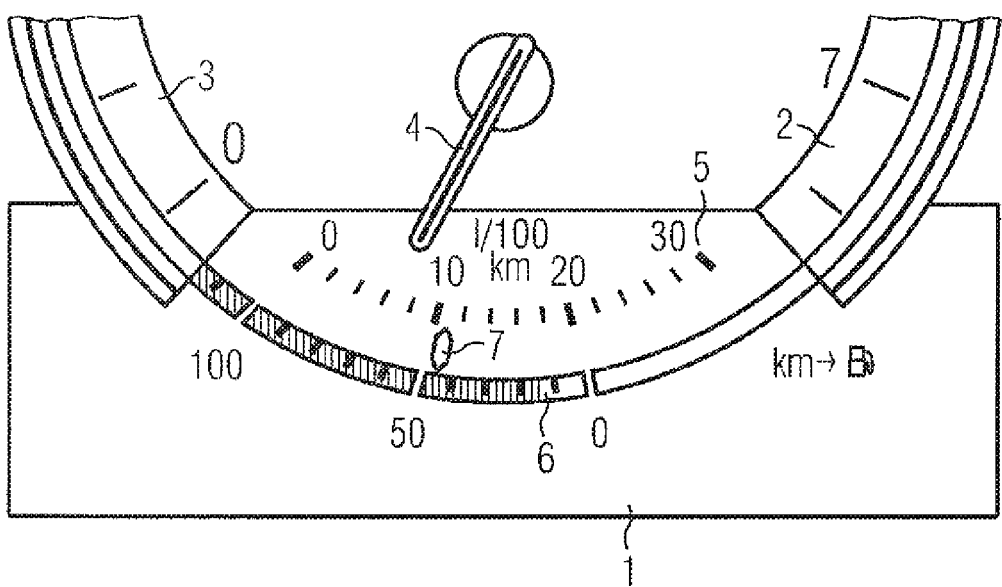
FIG. 2 is the exemplary embodiment from FIG. 1 in a different display situation.

FIG. 2 displays the first pointer 7 as well as an average consumption of approximately 11 liters per 100 kilometers. The distance that can be covered given the fuel tank level of the vehicle is, however, now displayed at approximately 45 kilometers. The color of the second scale 6 preferably changes with decreasing range, for example from black to red, to display the urgency of filling up the fuel tank.

Figure 3:
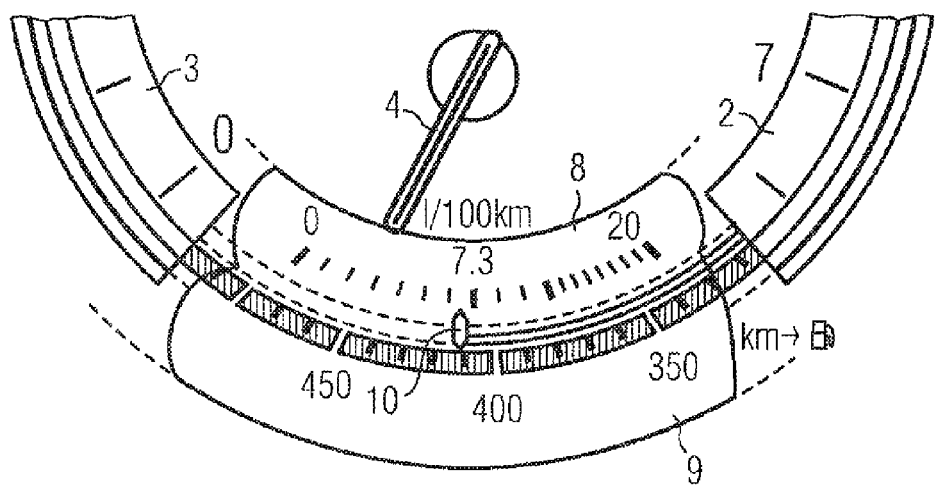
FIG. 3 is a second exemplary embodiment of the invention.

Just like the first exemplary embodiment in FIGS. 1 and 2, the second exemplary embodiment in FIG. 3 has scale segments 2 and 3 and a second pointer 4. A first scale 8, a second scale 9 and a first pointer 10 are designed as annular or semi-annular indicators such that they can be displaced separately about a common fulcrum and such that it is possible to display appropriately the average consumption and the distance that can still be covered given the fuel tank level. Annular indicators as such are known from EP 997338A. Here, one or more pointers are moved on a circular track about a fulcrum by a ring. Instead of the pointer, it is likewise also possible to move one or both of the scales 8, 9 about a fulcrum. In a display instrument configured optimally in visual terms, it is impossible to perceive the delimitation between the first scale 8, second scale 9 and the first pointer 10. Consequently, the boundaries of the individual components in FIG. 3 are illustrated by dashes. The imperceptible parts of the first scale 8 and second scale 9 that are located outside the view window and through which it is possible to perceive the scales 8 and 9 and the first pointer 10 are illustrated by dashes. The current instantaneous consumption already taken into account in the exemplary embodiment according to FIGS. 1 and 2 is represented by the second pointer 4.

Figure 4:
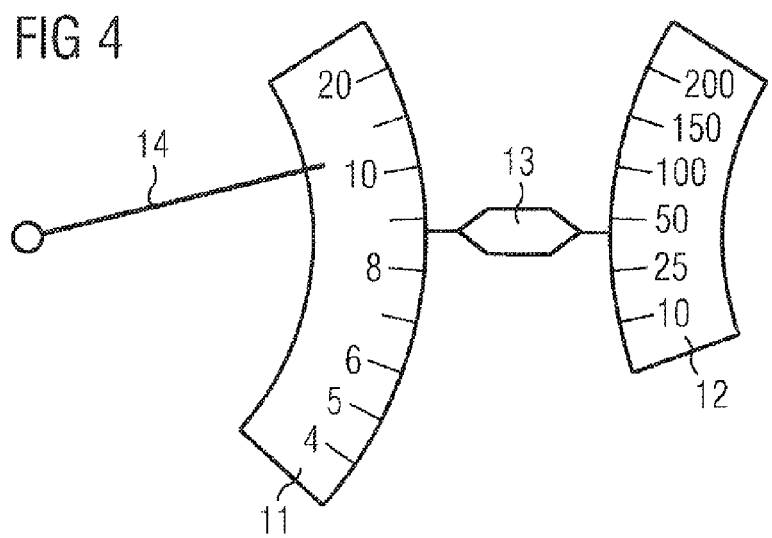
FIG. 4 is a third exemplary embodiment.

A first scale 11, which represents fuel consumption, a second scale 12, which represents a distance that can be covered, a first pointer 13, and a second pointer 14 are to be seen in FIG. 4. The first scale 11 and the second scale 12 are respectively designed as parts of a circle and arranged such that they can rotate about the respective center of the respective part of a circle. The first pointer 13 can be arranged in a fixed fashion, since the display of the average consumption and of the distance that can still be covered is implemented by a corresponding rotation of the first and second scales 11, 12, and such a display could not otherwise be implemented by changing the position of the pointer 13. The second pointer 14 indicates the instantaneous consumption in cooperation with the first scale 11. The second pointer 14 can be driven by a motor. The display illustrated in FIG. 4 can be part of two neighboring circular instruments such as, for example, a revolutions counter and tachometer. Instead of the mechanical design described, it is also possible to represent the display by an electro-optical dot matrix display.

Figure 5:
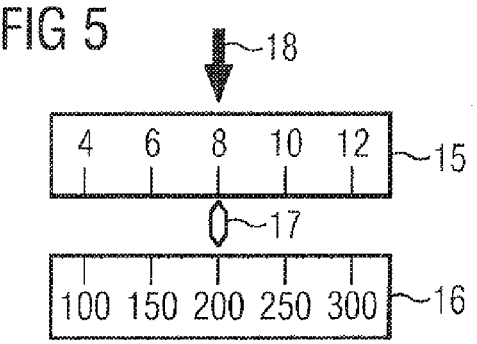
FIG. 5 shows a fourth exemplary embodiment of the invention.

A fourth exemplary embodiment in which a first scale 15 and a second scale 16 are respectively of rectangular configuration and are arranged such that they can be displaced linearly with respect to one another is shown in FIG. 5. A first pointer 17 can be used to represent both the average fuel consumption, in cooperation with the first scale 15, and the distance that can still be covered given the fuel tank level, in cooperation with the second scale 16. It is also further possible to use a second pointer 18 to represent an instantaneous consumption in cooperation with the first scale 15. The display illustrated in FIG. 5 can be implemented mechanically in such a way that the first scale 11 and the second scale 16 can be displaced parallel to one another, just like the first pointer 17 and the second pointer 18. Of course, it is also possible to design the representation using a dot matrix display.

It is also possible for a first reference end of the second scale to be configured in the shape of a circle or part of a circle, and for the corresponding other scale to be configured as a line. Finally, the above described display can also be implemented as part of a motor vehicle display configured entirely as a dot matrix display.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A motor vehicle display comprising:
a first scale configured to display a fuel consumption;
a second scale configured to display a distance that can still be traveled; and
a first unitary pointer configured to simultaneously point to a value of average fuel consumption on the first scale and a corresponding value for the distance that can still be traveled on the second scale, the corresponding value for the distance that can still be traveled based at least in part on a given a fuel tank level of the vehicle and the value of average fuel consumption.

2. The motor vehicle display as claimed in claim 1, further comprising a second pointer configured to point to an instantaneous value of fuel consumption on the first scale.

3. The motor vehicle display as claimed in claim 2, wherein at least one of the first scale and the second scale is configured as a dot matrix display.

4. The display as claimed in claim 2, wherein
at least one of the first scale and the second scale further comprises fixed marks, and
at least one of the first scale and the second scale is arranged in a variable position.

5. The display as claimed in claim 4, wherein at least one of the first scale and the second scale is configured to rotate relative to the other of the at least one of the first scale and the second scale.

6. The motor vehicle display as claimed in claim 5, wherein the first and the second scale are configured to rotate about a common fulcrum.

7. The motor vehicle display as claimed in claim 4, wherein at least one of the first scale and the second scale is configured to be displaced along a straight line.

8. The motor vehicle display as claimed in claim 1, wherein at least one of the first scale and the second scale is configured as a dot matrix display.

9. The display as claimed in claim 1, wherein
at least one of the first scale and the second scale further comprises fixed marks, and
at least one of the first scale and the second scale is configured to be arranged in a variable position.

10. The display as claimed in claim 9, wherein at least one of the first scale and the second scale is configured to rotate relative to the other of the at least one of the first scale and the second scale.

11. The motor vehicle display as claimed in claim 10, wherein the first and the second scale are configured to rotate about a common fulcrum.

12. The motor vehicle display as claimed in claim 9, wherein at least one of the first scale and the second scale is configured to be displaced along a straight line.

13. The motor vehicle display as claimed in claim 12, wherein the fixed marks are configured as at least one of scale bars and scale values.

14. The motor vehicle display as claimed in claim 9, wherein the fixed marks are configured as at least one of scale bars and scale values.

15. The motor vehicle display as claimed in claim 12, wherein at least one of the first scale and the first unitary pointer is movably arranged.

16. The motor vehicle display as claimed in claim 12, wherein at least one of the first scale and the first unitary pointer is fixedly arranged.

17. The motor vehicle display as claimed in claim 14, wherein the fixed marks are printed.

18. The motor vehicle display as claimed in claim 9, wherein the fixed marks are printed.

19. The motor vehicle display as claimed in claim 9, wherein the fixed marks are implemented by a change in height with respect to a scale surface.

20. The motor vehicle display as claimed in claim 1, wherein a position of the first scale is fixed and the first unitary pointer is also movably arranged.

\* \* \* \* \*